(12) United States Patent
Daoud et al.

(10) Patent No.: US 6,231,014 B1
(45) Date of Patent: May 15, 2001

(54) MECHANISM FOR LOW PROFILE ENCLOSURES

(75) Inventors: Bassel Hage Daoud, Parsippany; Jason A. Kay, Morristown; David Stevens Kerr, Morris Plains, all of NJ (US); Ivan Pawlenko, Holland, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/420,718

(22) Filed: Oct. 20, 1999

(51) Int. Cl.[7] .................................. F16L 3/10; F16L 3/06
(52) U.S. Cl. ........................................ 248/68.1; 174/65 R
(58) Field of Search ................................ 248/74.1, 74.3, 248/74.4, 68.1, 69; 174/65 R, 50

(56) References Cited

U.S. PATENT DOCUMENTS

| | | | |
|---|---|---|---|
| 1,365,625 | * | 1/1921 | Karitzky ................................. 248/69 |
| 1,381,234 | * | 6/1921 | Pleister ................................... 248/69 |
| 2,417,261 | * | 3/1947 | Morehouse .......................... 248/74.3 |
| 3,183,297 | * | 5/1965 | Curtiss ............................... 174/65 R |
| 4,524,937 | * | 6/1985 | Zizan ................................. 248/74.3 |
| 4,638,966 | | 1/1987 | Ford ...................................... 248/62 |
| 5,390,883 | * | 2/1995 | Songhurst ........................... 248/74.3 |
| 5,533,696 | * | 7/1996 | Laughlin et al. ................... 248/74.1 |
| 5,752,682 | * | 5/1998 | Anderson ............................. 248/68.1 |
| 5,961,081 | * | 10/1999 | Rinderer ............................... 248/68.1 |
| 6,056,245 | * | 5/2000 | White .................................. 248/74.1 |

FOREIGN PATENT DOCUMENTS

2325932 * 11/1973 (DE) .................................. 248/74.1

* cited by examiner

Primary Examiner—Ramon O. Ramirez
Assistant Examiner—Jon Szumny
(74) Attorney, Agent, or Firm—Schnader Harrison Segal & Lewis LLP

(57) ABSTRACT

A cable-supporting cable port of an electrical or similar box comprises two mating hollow semi-cylindrical members. The two members join, when the box is closed to form a unified cable port through which various cables or wires travel. Each semi-cylindrical member comprises a sidewall. In the rear member, the sidewall defines an aperture. A barbed projection extends from an internal edge of the sidewall into the aperture. The edge and the barbed projection define a channel for accepting an intermediate portion of a tie strap which has been bent into substantially a U-shape. The barbed projection has a longitudinal portion and a substantially horizontal barb portion. The tie strap is secured about the longitudinal portion, and prevented from disengaging the projection by engaging the barb portion. In this manner, the cable is secured to the projection by tightening the tie strap. The cable is securely held in place, without requiring access to the rear of the cable port.

6 Claims, 3 Drawing Sheets

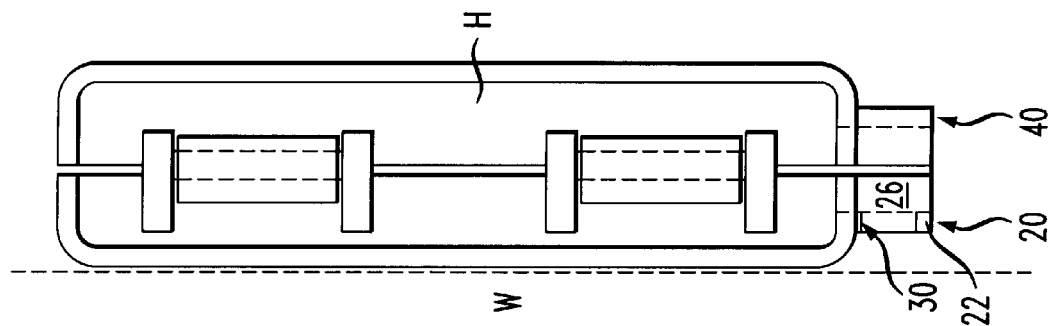
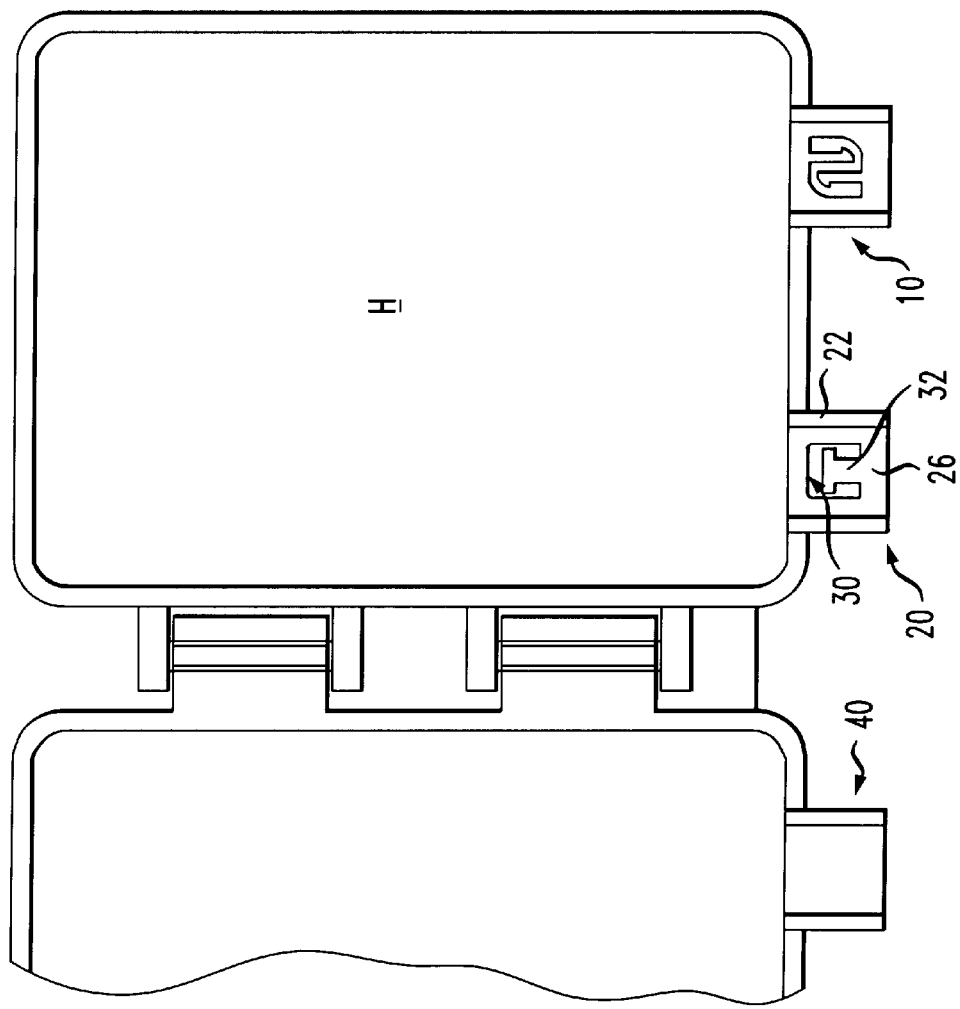

MECHANISM FOR LOW PROFILE ENCLOSURES

FIELD OF THE INVENTION

The invention relates generally to a cable supporting device. More specifically, the invention relates to a cable port which facilitates the use of a cable tie strap without requiring access to the rear or wall facing portion of the cable port.

DESCRIPTION OF THE RELATED ART

The electrical and wiring industries have long been plagued by the problem of stray or loose wires, and how to secure them. Electrical boxes have been developed which typically have one or more cable ports which are essentially cylindrical conduits which allow cables to pass into the electrical box. Often, the electrical box is a bi-valve construction, and the cable port is divided in half, yielding two semi-cylindrical mated portions. Invariably, the box is attached to a wall, and one of the semi-cylindrical cable port members has a rear surface facing the wall or other mounting surface. As advancements in electrical box and the electrical component design occur, the electrical box itself has become more and more narrow. Consequently, the cable port has become closer and closer to the wall.

Typically, wires are secured to the cable port via a cable tie strap. The tie strap is well known in the industry and generally is a locking nylon strap. Typically, one end of the strap is inserted through the front of the cable port through a slot passing to the rear of the cable port. The tie strap is then turned and passed through a second slot from the rear to the front. Cable is then run longitudinally through the cable port and secured by the cable strap. Unfortunately, with the low profile electrical boxes in use today, there is frequently no longer room for an operator to place his fingers between the cable port and the mounting wall. Accordingly, it has become necessary to remove the entire electrical box from the wall to gain access to the rear surface of the cable port to secure the tie straps. This is a timely, costly and labor intensive effort which can be avoided.

FIG. 6 shows an example of a typical prior art device. The device provides for a central portion about which a tie strap is oriented. The central portion defines two opposed slot areas through which the tie strap is passed. One can readily see from the figure that although this example does not show an electrical box structure, it would be quite difficult for an operator to insert his or her fingers into the support channel to push the tie strap through the respective slots. This particular design may enable the operator to insert the tie strap before inserting the support member into the support channel. This, however, is a luxury that is not generally found in other devices including electrical boxes.

Accordingly, it would be beneficial to provide a cable port, especially for use with electrical boxes, that facilitates the use of a cable tie strap without requiring access to the rear of the cable port.

SUMMARY OF THE INVENTION

A cable-supporting cable port of an electrical or similar box comprises two mating hollow semi-cylindrical members. The two members join, when the box is closed to form a unified cable port through which various cables or wires travel. Each semi-cylindrical member comprises a sidewall. In the rear member, the sidewall defines an aperture. A barbed projection extends from an internal edge of the sidewall into the aperture. The edge and the barbed projection define a channel for accepting an intermediate portion of a tie strap which has been bent into substantially a U-shape. The barbed projection has a longitudinal portion and a substantially horizontal barb portion. The tie strap is secured about the longitudinal portion, and prevented from disengaging the projection by engaging the barb portion. In this manner, the cable is secured to the projection by tightening the tie strap. The cable is securely held in place, without requiring access to the rear of the cable port.

BRIEF DESCRIPTION OF THE DRAWINGS

FIG. 1 is a front elevational view of an electrical housing employing a cable supporting cable port of the invention.

FIG. 2 is a side elevational view of an electrical housing employing a cable supporting cable port of the invention.

DETAILED DESCRIPTION OF THE INVENTION

Figure 3A:
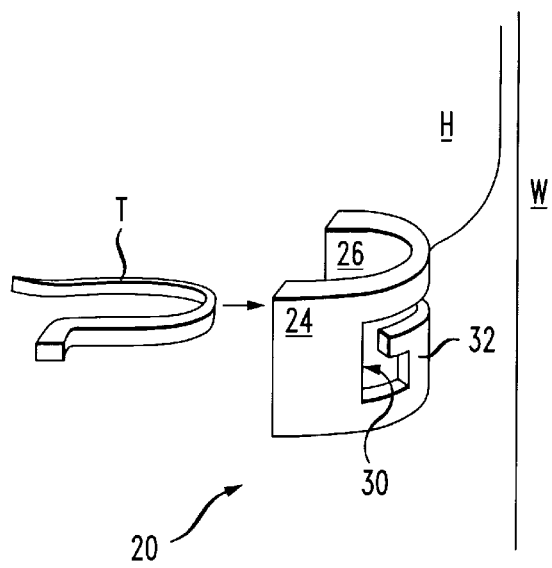
FIGS. 3a–3d show the use of a cable-supporting cable port according to the invention.
Figure 3B:
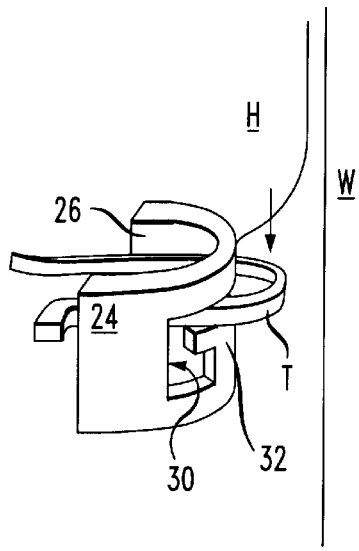
Figure 3C:
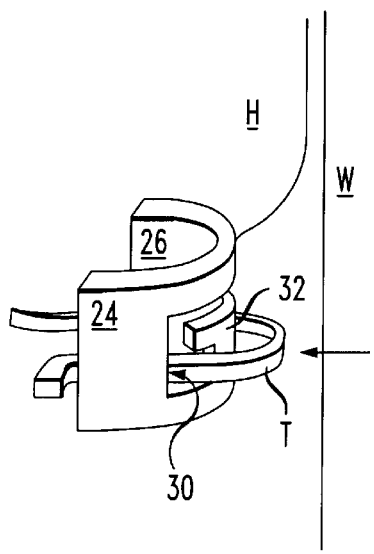

A cable supporting cable port of the invention is shown throughout the various figures wherein reference numerals designate like elements throughout.

The cable port is generally made up of two mating semi-cylindrical members which are front and rear portions of the cable port. The front and rear portions 40, 20 meet to create an open passageway into an electrical box or housing H. Other configurations can be used, but the cylindrical port is most common. The two semi-cylinders compliment each other to form an internal pathway for routing cable C when two portions of a bi-valve box, of which they are a part, are closed.

A rear portion 20 of the cable port is the primary focus of this invention. This portion corresponds to the wall mounted half of the electrical box H. The rear portion 20 comprises a sidewall 22, which defines, by its semi-circular nature, a longitudinal path along its front surface 26 for routing cable C. A rear surface 24 is disposed such that it faces the mounting wall W.

The sidewall 22 contains an aperture, which passes completely through the sidewall 22 from front to rear. Preferably, as seen in the FIGS., the aperture has a substantially square shape, although others may be used. The aperture is defined by an internal edge 30 of the sidewall 22 which defines the periphery of the aperture.

From the internal edge 30 of the sidewall 22 extends a barbed projection 32. The projection 32 extends longitudinally into the aperture, and is in substantial alignment with the sidewall 22. The projection 32 itself is made up of a longitudinal portion 34 extending from the internal edge 30 of the sidewall 22 and a lateral barbed portion 36 at an opposite end. The longitudinal portion 34 is substantially parallel to the path of the cable C, while the lateral portion 36 is substantially perpendicular to the longitudinal portion 34. An open space is located between the barbed end 36 of the projection 32 and the sidewall 22, for receiving a standard tie strap T. The projection provides a mounting surface for the tie strap used to secure cables. The barbed portion prevents the tie strap from unintentionally sliding off of the longitudinal projection.

FIG. 3 shows the steps involved in inserting the tie strap T. The tie strap T is bent by the user as shown in FIG. 3a so that an intermediate portion forms a U-shape, which passes between the sidewall 22 and the barbed end 36 of the projection 32. The U-shaped strap is passed completely through the aperture so that the U portion extends beyond the rear surface 24 of the rear portion 20 of the cable port, as shown above in FIG. 3b. The tie strap T is then pushed past the barbed portion 36 of the projection 32 and engaged with the longitudinal portion 34 of the projection 32, with end portions of the tie strap T extending toward the front of the cable port member, as shown in FIG. 3c.

Figure 3D:
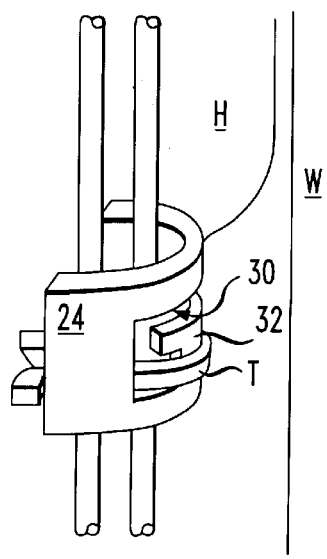

In this manner, a tie strap T is secured to the cable port in a transverse direction to the path of the cable C to be held. FIG. 3d shows the cable C secured within the cable port by securing the ends of the tie strap T around the cable. Once secured, the cable C is held in place by the tension of the tie strap T, which is prevented from moving longitudinally or becoming unhooked by the barbed portion 36 of the projection 32. Holding the cable securely also relieves strain often caused by gravity, or bending of cable prior to entering the box.

Figure 4:
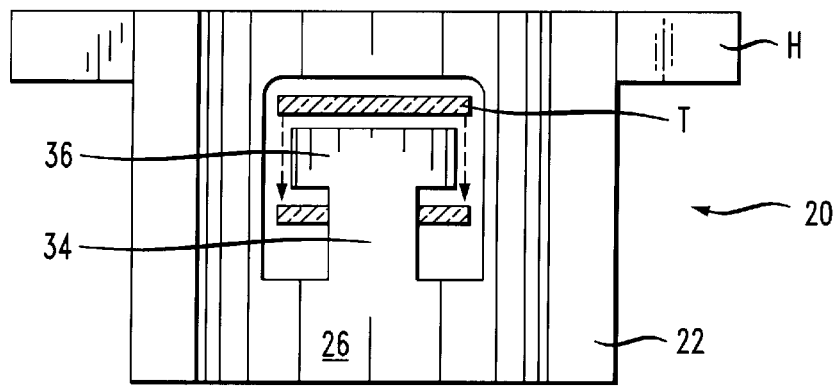
FIG. 4 is a front elevational view of a cable port of the invention.

In one embodiment, the longitudinal projection 34 forms a T-shape. As shown in FIGS. 3 and 4, the cable tie T is inserted adjacent to the lateral portion of the T, and passed around that same portion to engage the longitudinal portion 34 of the projection 32. Once secured, the T acts as a guard against dislodgement of the tie strap T from the projection 32.

Figure 5:
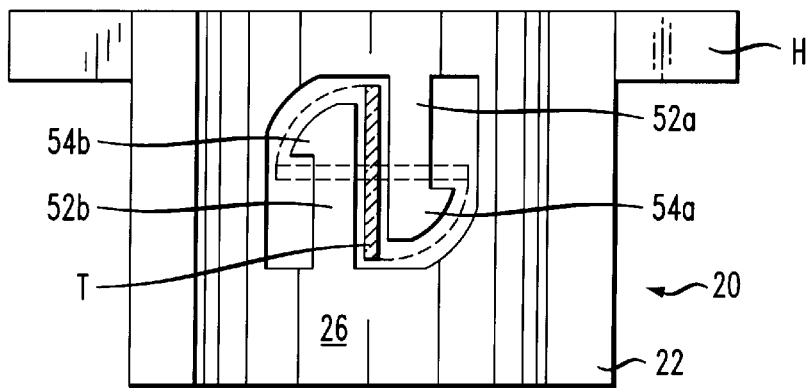
FIG. 5 is a front elevational view of an alternative embodiment of the invention.
Figure 6:
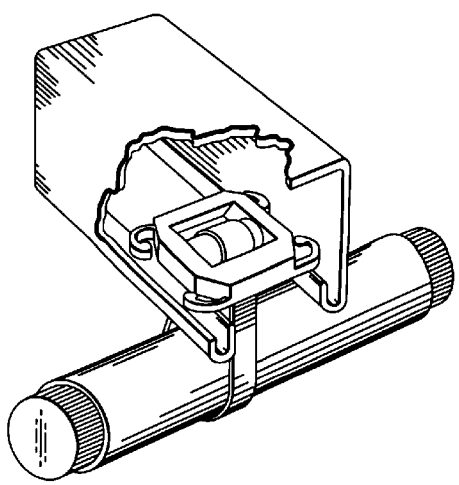
FIG. 6 is a perspective view of a prior art cable supporting device.

In an alternative embodiment shown in FIG. 5, two opposed projections 52a, 52b are provided. Each projection extends longitudinally from opposed sides of the internal edge 30 of the sidewall 22. Each projection extends into the aperture, adjacent the other, to a position beyond the other. The overlapping portions provide a base on which the cable tie T is secured. The projections 52a, 52b are also provided with a barbed portion 54a, 54b, which prevent the tie strap from moving longitudinally in either direction the opposed nature of the projections 52a, 52b.

Between the two projections, a tie-strap receiving space is defined. As described above, a tie-strap bent into a U-shape is inserted into the space. In this embodiment, however, should be turned about the tie strap 90° after insertion so that each leg of the U-shaped strap passes around one of the projections 52a, 52b. The tie-strap is then positioned in the area of overlap of the two projections. The respective barb portions prevent the tie-strap from rotating out of position. Finally, a cable C is inserted, and the tie-strap T secured around the cable. As in the previous embodiment, this arrangement secures the cable without requiring access to the rear of the cable port.

Accordingly, the invention provides a mechanism by which a cable tie may be inserted for securing cables and the like without requiring access to the rear portion of the mechanism.

What is claimed is:

1. A cable supporting cable port comprising:

(a) a sidewall having an interior and exterior, and defining an aperture passing completely therethrough, said sidewall defining a longitudinal pathway for routing cable along the interior thereof;

(b) a barbed projection for holding and retaining a tie strap extending into said aperture in substantial planar alignment with said sidewall, said projection comprising a proximal longitudinal portion and a distal lateral barbed portion;

(c) wherein said barbed projection is positioned in said aperature to define a channel for accepting a U-shaped intermediate portion of a tie strap prior to displacement of the tie strap to engage said barbed projection; and (d) wherein the barbed projection is adapted to hold and retain the tie strap when the tie strap secured around the cable and the barbed projection.

2. The cable port of claim 1, wherein said barbed projection is T-shaped.

3. The cable port of claim 1, wherein said cable port is adapted to facilitate the securing of cables to said sidewall without access to said exterior of said cable port.

4. The cable port of claim 1, wherein said cable port forms an integral part of a housing.

5. A cable supporting cable port comprising:

(a) a sidewall having an interior and an exterior, defining a longitudinal pathway for routing cable along the interior thereof;

(b) said sidewall having an internal edge defining an aperture passing completely through said sidewall from interior to exterior;

(c) two opposed barbed projections for holding and retaining a tie strap, wherein each barbed projection has a longitudinal portion extending from said internal edge and a barbed lateral portion opposite said internal edge;

(d) said barbed projections defining a receptor channel therebetween for accepting a U-shaped intermediate portion of a tie strap;

(e) said barbed projections and said internal edge defining opposed slot areas for directing respective ends of the tie strap when the accepted tie strap is rotated 90°; and (f) wherein each of said projections extend to a point beyond the other, such that said barbed portions are adapted to prevent the rotation of a tie strap in either direction when secured.

6. The cable port of claim 5, wherein said cable port is integrally formed as part of a housing.

* * * * *